(12) United States Patent
Damamme et al.

(10) Patent No.: US 11,314,085 B2
(45) Date of Patent: Apr. 26, 2022

(54) VIEWING DEVICE COMPRISING A PUPIL EXPANDER INCLUDING TWO MIRRORS

(71) Applicant: THALES, Courbevoie (FR)

(72) Inventors: Natacha Damamme, Merignac (FR); Jean-Luc Bardon, Merignac (FR); Jean-Louis Bourgain, Merignac (FR); Philippe Coni, Merignac (FR)

(73) Assignee: THALES, Courbevoie (FR)

( * ) Notice: Subject to any disclaimer, the term of this patent is extended or adjusted under 35 U.S.C. 154(b) by 196 days.

(21) Appl. No.: 16/782,940

(22) Filed: Feb. 5, 2020

(65) Prior Publication Data

US 2020/0264429 A1 Aug. 20, 2020

(30) Foreign Application Priority Data

Feb. 14, 2019 (FR) ...................................... 1901468

(51) Int. Cl.
*G02B 27/01* (2006.01)

(52) U.S. Cl.
CPC ..... *G02B 27/0101* (2013.01); *G02B 27/0172* (2013.01); *G02B 2027/0118* (2013.01); *G02B 2027/0123* (2013.01)

(58) Field of Classification Search
CPC ...... G02B 27/01; G02B 27/017; G02B 27/30; G02B 27/0081; G02B 27/0101; G02B 27/0103; G02B 27/0172; G02B 27/0178; G02B 27/0093; G02B 27/283; G02B 2027/0118; G02B 2027/0123; G02B 2027/0125; G02B 2027/0127; G02B 2027/0174; G02B 2027/0178; G02B 2027/0187; G02B 6/00; G02B 6/0816; G02B 6/0055; B60K 2370/23; B60K 2370/27; B60K 2370/29; B60K 2370/31; B60K 2370/336
See application file for complete search history.

(56) References Cited

U.S. PATENT DOCUMENTS

| | | | | |
|---|---|---|---|---|
| 10,409,057 | B2* | 9/2019 | Aleem | G02B 27/0103 |
| 2008/0238814 | A1* | 10/2008 | Ishikawa | G02B 27/0101 |
| | | | | 345/7 |
| 2014/0140653 | A1* | 5/2014 | Brown | G02B 27/0172 |
| | | | | 385/10 |

(Continued)

FOREIGN PATENT DOCUMENTS

| | | |
|---|---|---|
| EP | 2 733 517 A1 | 5/2014 |
| WO | 2010/092409 A1 | 8/2010 |

*Primary Examiner* — Sultan Chowdhury
(74) *Attorney, Agent, or Firm* — BakerHostetler

(57) ABSTRACT

A viewing devices includes an optical assembly comprising a display, an optical system forming of this display an image at infinity and a light guide for expanding a pupil in two spatial directions. The guide comprises three planar mirrors and two semi-reflective plates, the optical axis of the optical assembly being inclined with respect to the surface of the first planar mirror by an angle different from zero and strictly smaller than 90 degrees, the light beams output from the optical assembly propagating inside the light guide via successive reflections from the planar mirrors and the semi-reflective plates, the transmission of the light beams output from the optical assembly to outside of the light guide occurring via successive transmissions by the second semi-reflective plate.

8 Claims, 8 Drawing Sheets

(56) References Cited

U.S. PATENT DOCUMENTS

2016/0048017 A1    2/2016    Kasahara et al.
2017/0299862 A1*  10/2017  Yamaguchi .......... G02B 26/101
2018/0321496 A1*  11/2018  Bohn ..................... G06F 3/015

* cited by examiner

VIEWING DEVICE COMPRISING A PUPIL EXPANDER INCLUDING TWO MIRRORS

CROSS-REFERENCE TO RELATED APPLICATIONS

This application claims priority to foreign French patent application No. FR 1901468, filed on Feb. 14, 2019, the disclosure of which is incorporated by reference in its entirety.

FIELD OF THE INVENTION

The general technical field of the invention is that of viewing systems that allow an image generated by a viewing device to be superposed on the exterior. These devices are used in various fields of application. These devices may be fastened to a structure such as a vehicle dashboard or an aeronautical instrument panel. Head-up displays (HUD) are then spoken of. They may also be mounted on a carrier worn on the head of the user. They are then known as helmet mounted displays (HMD).

BACKGROUND

FIG. 1 shows a first architecture allowing this type of viewing system to be achieved. In this figure and the following, optical components have been drawn with thick solid lines and light rays with thin or dashed lines. Optics containing lenses have been symbolized by double-headed arrows. The exterior landscape has been symbolized by a sun.

This first architecture comprises a display 1, a dog-legged collimating optic 2 and a semi-reflective planar plate 3 placed in the field of view of an observer Y. The image generated by the display is projected to infinity by the collimating optic. The semi-reflective plate partially reflects this image to the observer and partially transmits the exterior landscape. The observer therefore sees, in superposition, the image of the display on the exterior landscape. The main drawback of this solution is that, by construction, the eye of the observer is located far from the pupil of the system. The instantaneous field of observation is therefore limited if it is desired for the system to preserve a reasonable weight and dimensions.

The viewing system shown in FIG. 2 does not have this drawback. It comprises a display 1, a steering optic 4 that forms a real image of this display, and a semi-transparent curved optical combiner 5 that forms of this real image an image at infinity. It has been demonstrated that this optical combination allows an image of the pupil to be formed on the eyes of the observer. The preceding limitation disappears and the instantaneous field of observation is now only limited by the dimensions of the optical combiner. However, this solution has other drawbacks. The optical combiner is necessarily an off-axis component. The steering optic and the combiner are complex to produce. In the end, a system that is complex, expensive and relatively bulky is obtained.

To mitigate these various drawbacks, so-called pupil-expansion systems have been proposed. Such systems are sometimes referred to using the acronym EPE, which is the acronym of "Exit Pupil Expansion". The operating principle of an EPE system is shown in FIGS. 3 to 9. An EPE viewing system comprises a display 1, a collimating optic 6 having an exit pupil, and a light guide 7 made of transparent material and with planar and parallel faces. The light beams collimated by the display for example penetrate into the light guide via one of its lateral faces 71. The entry into the guide may be achieved, as in the case shown, using a prism but also a grating, which is then referred to as the entrance grating.

These beams propagate through the light guide via total reflection from the parallel faces 72 and 73 of the guide, as may be seen in FIG. 3.

For the observer to be able to perceive an image, it is necessary to make it exit from the guide. There are a plurality of optical solutions. By way of first example, the light guide of the EPE system of FIG. 4 comprises two parallel semi-reflective plates 74 and 75 placed so as to extract some of the collimated beams. By way of second example, the light guide of FIG. 5 comprises an array 76 of microstructures or micro-prisms that perform the same functions. Lastly, the light guide of FIG. 6 comprises a diffraction grating 77 that diffracts some of the light toward outside the guide in the desired direction. In FIG. 6, the grating is located on one of the two faces of the light guide. It may also be located inside the guide.

The light guides shown in FIGS. 4 to 6 allow a pupil extension in a given direction. To extend the pupil in two spatial directions, it is possible to use two coupled gratings/arrays 7 and 8, as may be seen in FIG. 7, which allow the pupil to be extended in two spatial dimensions. These two directions are not necessarily normal to each other. In FIG. 7, the first grating/array 7 allows the pupil to be extended in the horizontal dimension, and the second grating/array 8 it to be extended in the vertical direction. The circled crosses indicate that the light is propagating in a plane perpendicular to that of the page.

These pupil expansion systems may be placed facing the observer, as may be seen in FIG. 8. In this case, the observer Y views the landscape directly through the light guide. "See-through" systems are spoken of.

These pupil expansion systems may also be associated with an optical combiner, as may be seen in FIG. 9, in which the light beams are reflected toward the observer by means of a semi-reflective plate 9 that ensures the transmission of the exterior landscape.

These viewing systems have many advantages with respect to conventional viewing systems. They are less bulky, lighter, less expensive and are easier to install on a dashboard or a head-worn carrier.

They however have a number of drawbacks. These guides necessarily perform two separate functions, a first function propagating the light and a second function extracting this light. The guides are therefore, by nature, complex to produce. In particular, the diffraction gratings are difficult to compute and to produce.

Moreover, field of view (FOV) remains limited. In systems comprising diffraction gratings, the spectral width of the source limits the FOV to about 35 degrees. Systems comprising semi-reflective plates or micro-prisms are limited by their geometries and at the present time have maximum FOVs that do not exceed 40 degrees. Lastly, the quality of colour pupil-expansion systems is still limited, and hence aeronautical HUD applications are monochrome at the present time.

SUMMARY OF THE INVENTION

The pupil-expansion viewing system according to the invention does not have the preceding drawbacks. It simply comprises a mirror and a semi-reflective plate placed facing. The latter is used both for the propagation and extraction of the light. More precisely, the invention relates to a viewing device comprising an optical assembly comprising a display and an optical system forming of this display an image at infinity, characterized in that the viewing device comprises a pupil-expansion light guide comprising a planar mirror and a semi-reflective plate parallel to the planar mirror, the optical axis of the optical assembly being inclined with respect to the surface of the planar mirror by an angle different from zero and strictly smaller than 90 degrees, the light beams output from the optical assembly propagating inside the light guide via successive reflections from the planar mirror and the semi-reflective plate, the transmission of the light beams output from the optical assembly to outside of the light guide occurring via successive transmissions by the semi-reflective plate.

Advantageously, the light guide comprises an assembly consisting of a first reflective planar mirror, a second reflective planar mirror, a third reflective planar mirror, a first semi-reflective planar plate and a second semi-reflective planar plate, the second plate being in the same plane and in the extension of the first mirror, the second plate and the first mirror being parallel to the second mirror, the first plate being parallel to the third mirror, the first plate and the third mirror being perpendicular to the first mirror, the first plate being located at the junction of the first mirror and of the second plate, the optical axis of the optical assembly being inclined with respect to the surface of the first planar mirror by an angle different from zero and strictly smaller than 90 degrees.

Advantageously, the viewing device comprises an optical combiner with no optical power that is placed after the light guide, reflects the light output from the light guide and transmits the light output from a source exterior to the device.

Advantageously, at least one of the semi-reflective plates has a variable optical transmission so that the light beams output from the optical assembly and transmitted to outside the light guide by successive transmissions and reflections inside the light guide have substantially the same overall luminance.

Advantageously, the optical combiner has a variable optical transmission.

Advantageously, the field of the optical system is smaller than or equal to 40 degrees on at least one of its axes.

Advantageously, the angle of inclination of the optical axis is comprised between 50 degrees and 60 degrees.

Advantageously, the distance separating the planar mirror from the semi-reflective plate is comprised between 10 millimetres and 20 millimetres, the diameter of the entrance pupil of the viewing device being comprised between 15 millimetres and 25 millimetres.

Advantageously, the distance separating the first planar mirror from the second planar mirror is comprised between 10 millimetres and 20 millimetres and the distance separating the third planar mirror from the first semi-reflective plate is comprised between 10 millimetres and 20 millimetres, the diameter of the entrance pupil of the viewing device being comprised between 15 millimetres and 25 millimetres.

Advantageously, for any inclination of the light beams output from the optical assembly, the separation between a beam propagating through the light guide and the following beam having undergone two additional reflections from a planar mirror and the semi-reflective plate that is parallel thereto is smaller than 1.5 millimetres.

BRIEF DESCRIPTION OF THE DRAWINGS

The appended drawings illustrate the invention.

DETAILED DESCRIPTION

Figure 1:
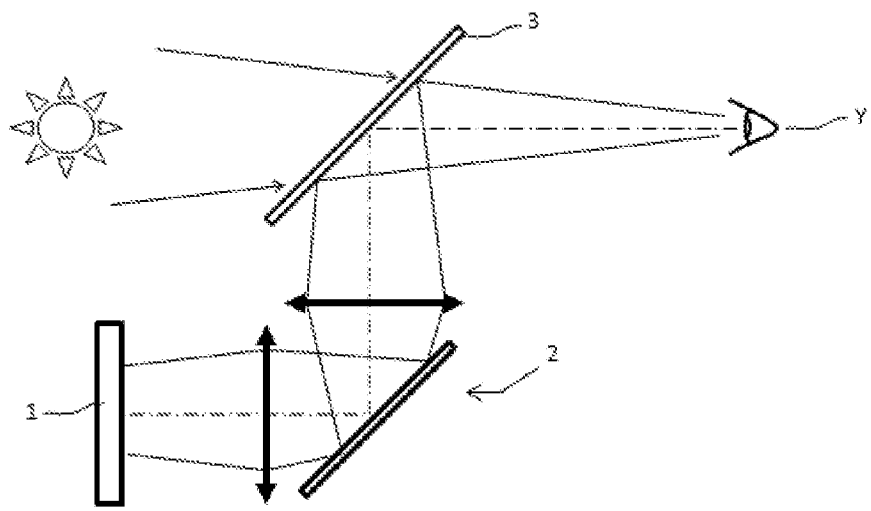
FIG. 1 shows a first viewing device according to the prior art.
Figure 2:
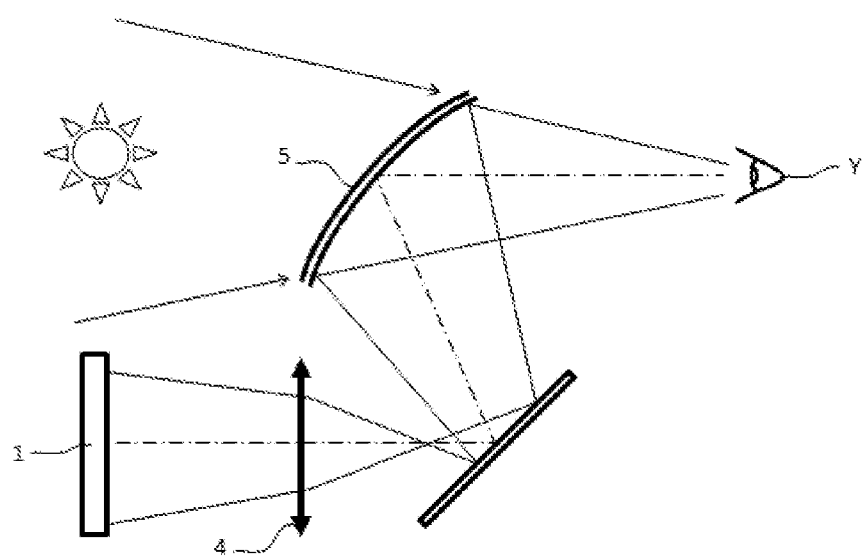
FIG. 2 shows a second viewing device according to the prior art.
Figure 3:
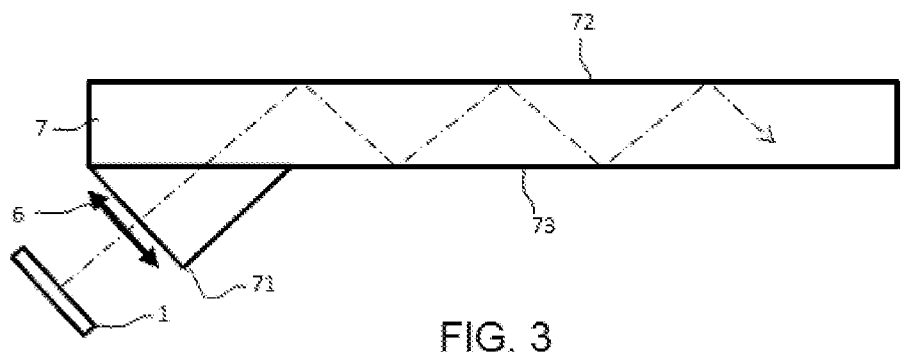
FIG. 3 shows the principle of propagation of light through a pupil-expansion viewing device according to the prior art.
Figure 4:
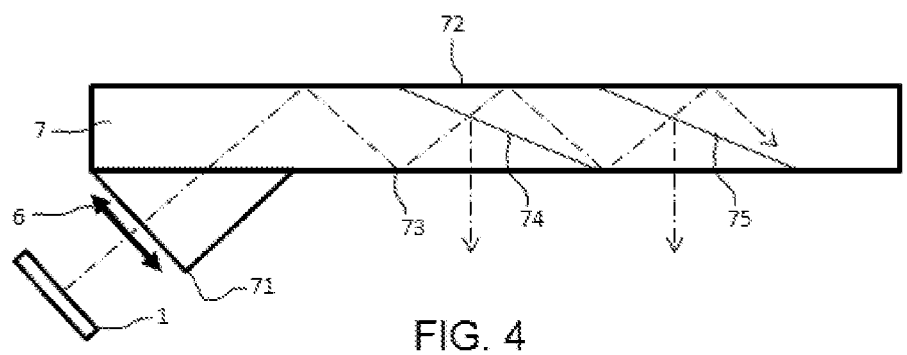
FIG. 4 shows a first pupil-expansion viewing device according to the prior art.
Figure 5:
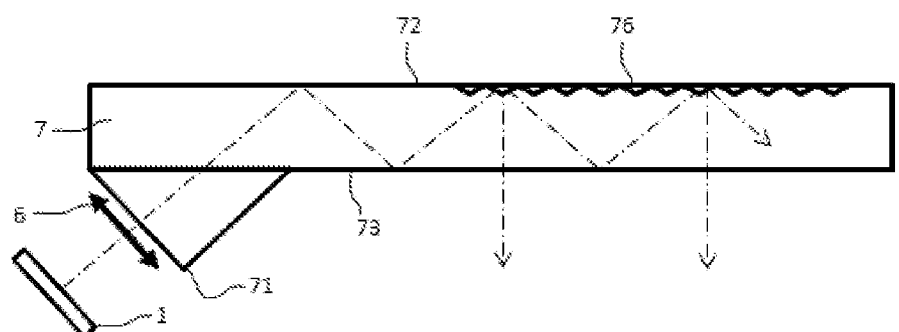
FIG. 5 shows a second pupil-expansion viewing device according to the prior art.
Figure 6:
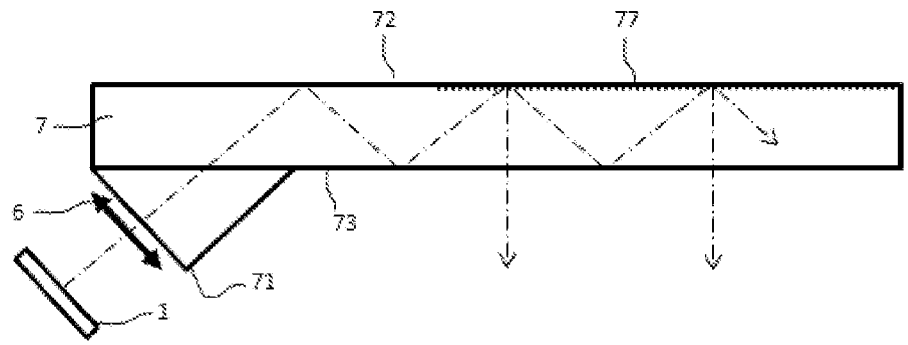
FIG. 6 shows a third pupil-expansion viewing device according to the prior art.
Figure 7:
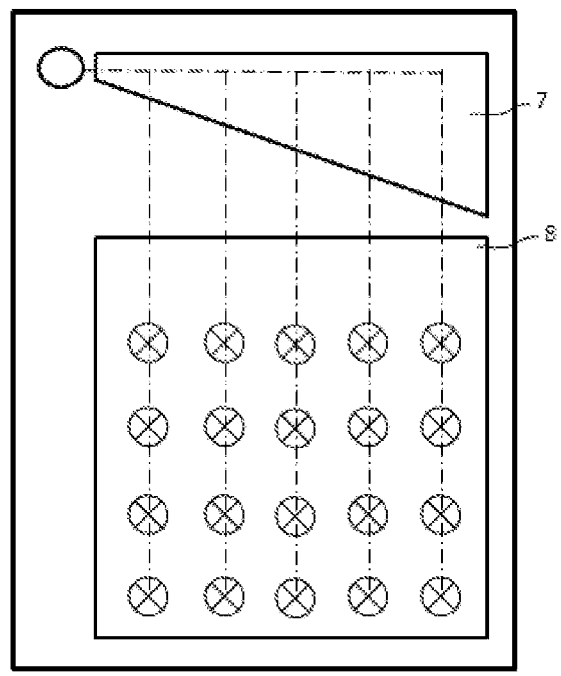
FIG. 7 shows a two-axis pupil-expansion viewing device according to the prior art.
Figure 8:
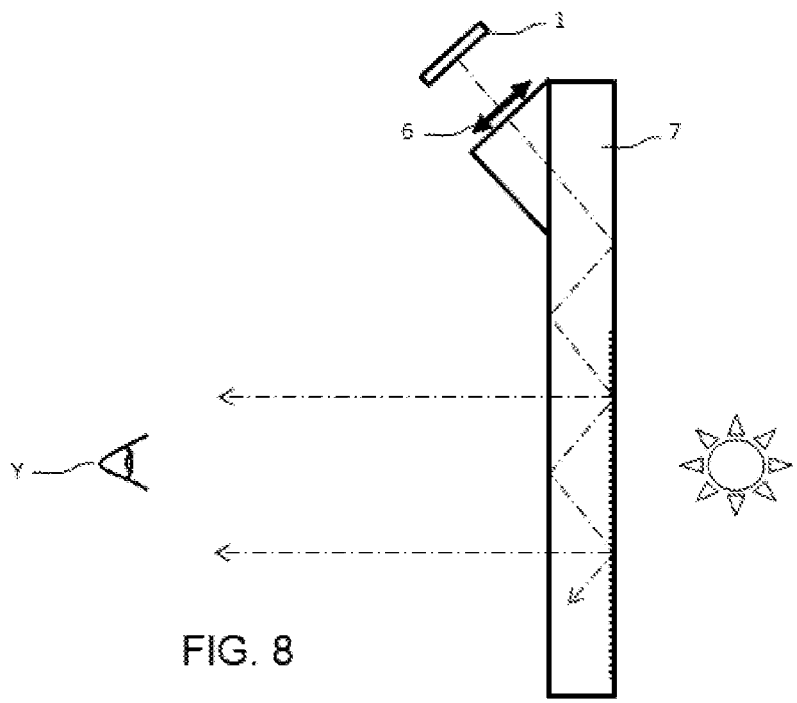
FIG. 8 shows a first use of a pupil-expansion viewing device according to the prior art.
Figure 9:
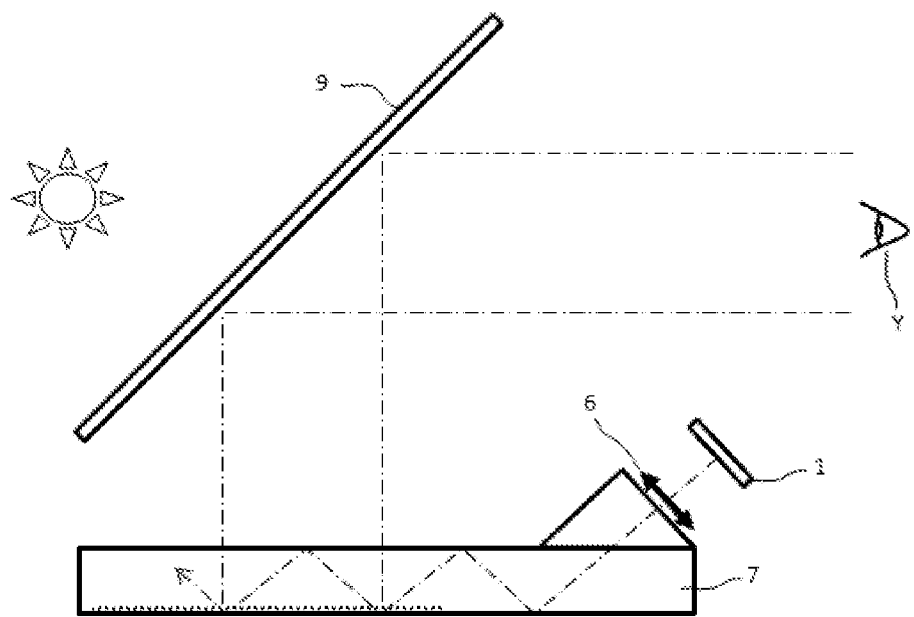
FIG. 9 shows a second use of a pupil-expansion viewing device according to the prior art.
Figure 10:
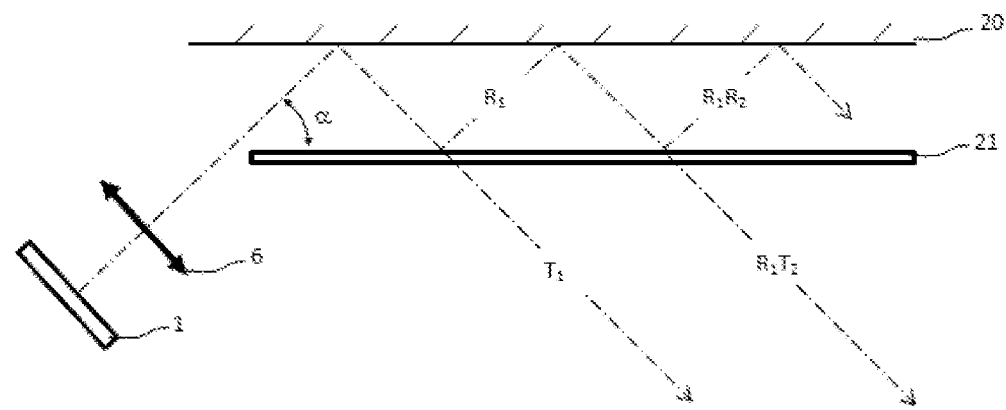
FIG. 10 shows the light guide of a pupil-expansion viewing device according to the invention.

FIG. 10 shows the principle of a pupil-expansion viewing device according to the invention. In the case of FIG. 10, the pupil expansion is performed in a single direction. As will be seen, it is possible to perform this expansion in two different directions.

This viewing device comprises a collimating optical assembly and a light guide. The optical assembly comprises a display 1 and an optical system 6 that forms of this display an image at infinity. The display may be of any nature. In particular, the device works with all types of polychromatic display.

The light guide comprises a planar mirror 20 and a semi-reflective plate 21 parallel to the planar mirror, the optical axis of the optical assembly being inclined with respect to the surface of the planar mirror by an angle α.

Below, by semi-reflective plate what is meant is an optical plate that is partially reflective, that comprises a treatment that transmits some of the incident light and that reflects the rest of this incident light. The reflected and transmitted portions are not necessarily equal.

The angle α is necessarily different from zero in order for the light beams to be able to be reflected between the mirror and the semi-reflective plate. This angle is also different from 90 degrees so that the beams can propagate over a certain distance without excessive attenuation between the mirror and the semi-reflective plate.

The light guide works as follows. A light ray of incidence a output from the pupil of the collimating optical assembly is totally reflected by the mirror. It is then partially transmitted and partially reflected by the semi-reflective plate. The local reflectance is $R_1$ and the local transmittance is $T_1$ with $T_1$ substantially equal to $1-R_1$. The reflected portion is once again reflected by the mirror then once again partially transmitted by the semi-reflective plate with a local transmittance equal to $R_1 \cdot T_2$, i.e. $R_1 \cdot (1-R_2)$.

Thus, from a light ray entering via the pupil, the assembly consisting of the mirror and the semi-reflective plate generates a succession of transmitted light beams that are parallel to one another and spatially offset in a given direction. A succession of images of the pupil of the optical assembly is then obtained. By adjusting the local values of the reflection coefficient of the semi-reflective plate, it is possible to achieve transmitted light rays of similar luminance levels.

With respect to the prior-art devices, the waveguide according to the invention has one main advantage. The semi-reflective plate is used both for the propagation of the light beams and for the extraction thereof, this considerably simplifying production of the system.

Figure 11:
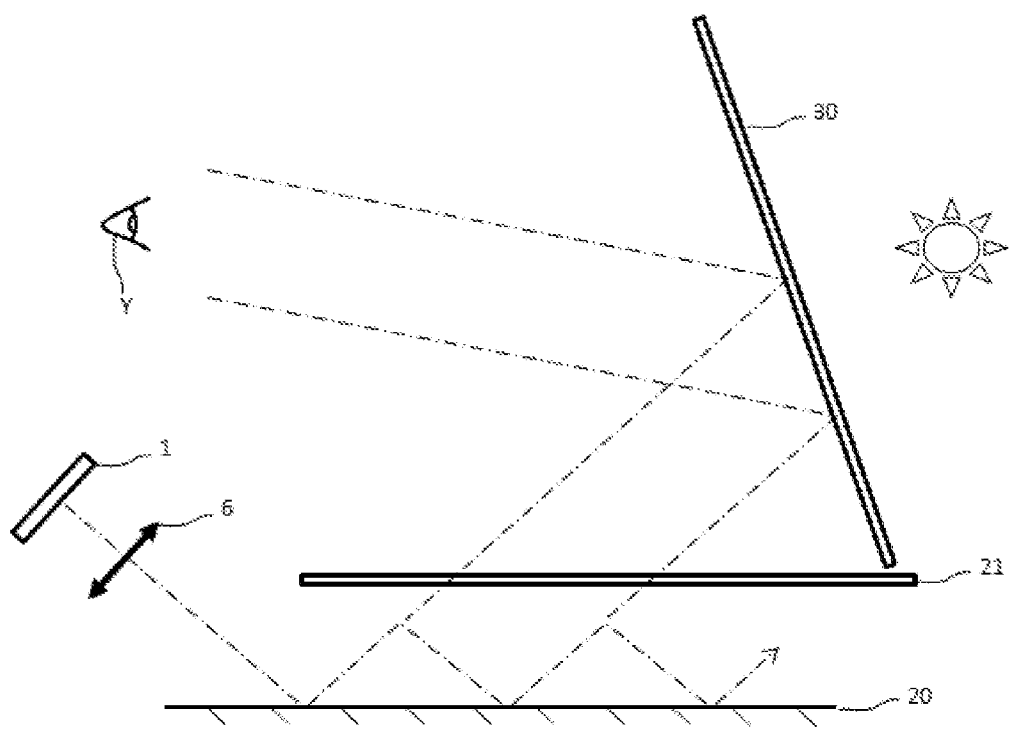
FIG. 11 shows a pupil-expansion viewing device with its combiner according to the invention.

By nature, the observer cannot see through the light guide according to the invention. Thus, as may be seen in FIG. 11, the viewing device comprises a semi-transparent optical combiner 30 without optical power placed after the light guide. This combiner reflects the light output from the light guide and transmits the light output from a source exterior to the device. By way of example, the combiner shown in FIG. 11 is a single semi-reflective planar plate. This combiner may optionally have a variable optical transmission so as to improve the contrast of the image output from the viewing device on the exterior landscape.

Figure 12:
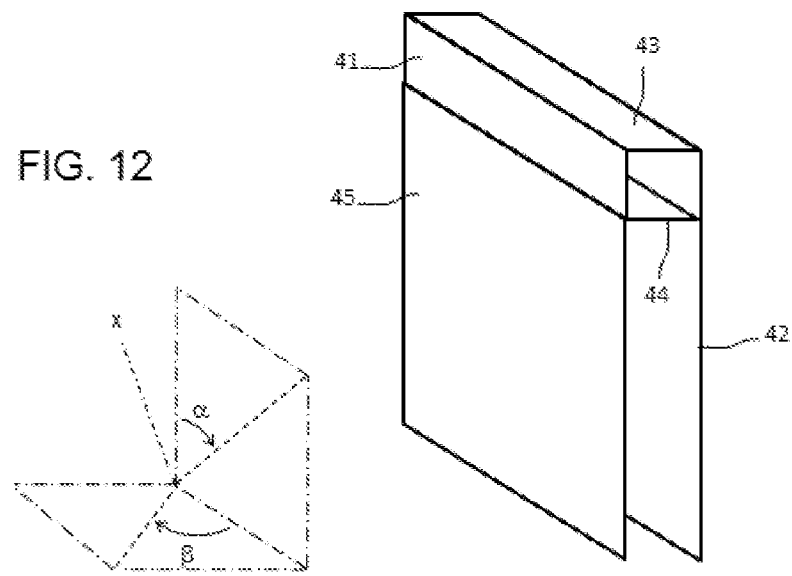
FIG. 12 shows the light guide of a two-dimensional pupil-expansion viewing device according to the invention.
Figure 13:
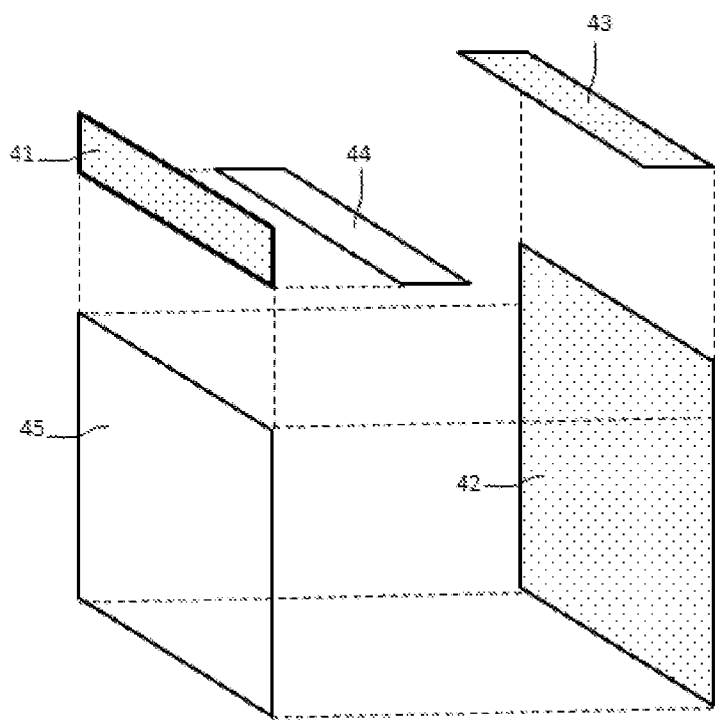
FIG. 13 shows an exploded view of the preceding light guide according to the invention.

The light guide of FIG. 10 allows pupil expansion in one given direction. In many applications, it is necessary to extend the pupil in two spatial directions. In this case, the light guide according to the invention comprises an assembly consisting of five elements. By way of example of an embodiment, a guide of this type is shown in FIGS. 12 and 13. FIG. 13 is an exploded view of FIG. 12.

This two-dimensional guide is composed of a first reflective planar mirror 41, of a second reflective planar mirror 42, of a third reflective planar mirror 43, of a first semi-reflective planar plate 44 and of a second semi-reflective planar plate 45.

The second plate 45 is in the same plane and in the extension of the first mirror 41. The second plate 45 and the first mirror 41 are parallel to the second mirror 42. The first plate 44 is parallel to the third mirror 43. The first plate 44 and the third mirror 43 are perpendicular to the first mirror 41. The first plate 44 is located at the junction of the first mirror 41 and of the second plate 45.

The optical axis x of the optical assembly is inclined with respect to the surface of the third planar mirror by a first angle $\alpha$ that is different from zero and strictly smaller than 90 degrees and, with respect to the first planar mirror by a second angle $\beta$ that is different from zero and strictly smaller than 90 degrees. These angles have been shown in a Cartesian coordinate system in FIG. 12.

Because of the way in which the system is defined, all the light rays output from the optical assembly impact first a pair of adjacent optical elements, i.e. either the first mirror 41 and the third mirror 43, or the second mirror 42 and the third mirror 43, or the first mirror 41 and the first semi-reflective plate 44, or the second mirror 42 and the first semi-reflective plate 44.

After their passage through the light guide, these light rays are transmitted by the second semi-reflective plate 45. It has been demonstrated that, in each of these four particular cases, two light rays having the same entry incidence but each encountering a first element that may be a different mirror or a different semi-reflective plate, are transmitted with the same exit incidence by the second semi-reflective plate independently of their route through the light guide.

For example, if the light rays output from the optical assembly are oriented toward the first mirror 41 and the first semi-reflective plate 44 with an angle $(\alpha,\beta)$, then whatever the first element 41 or 44 impacted by a ray, the latter will exit from the system via the semi-reflective plate 45 with an angle $(\alpha,\beta)$.

The one-dimensional or two-dimensional pupil-expansion light guides according to the invention are composed of planar mirrors and semi-reflective plates. Those skilled in the art will have no particular difficulty producing them; the spacing between the semi-reflective plates and the mirrors that face them may be achieved by means of high-precision optical spacers.

The main geometric characteristics of a viewing device comprising a light guide according to the invention are, in one of its expansion directions:

the entrance pupil of diameter P;

the field of view, denoted FOV. In the present case, the angle of inclination a may vary between a minimum angle $\alpha_{min}$ and a maximum angle $\alpha_{max}$. The difference between these two angles of inclination gives the angular value of the field of view in one direction. Below, the angle of inclination corresponding to the average of the two preceding angles has been denoted $\alpha_{moy}$. This angle defines the inclination of the optical axis of the optical assembly with respect to the light guide;

the length and width of the light guide. They are set by the dimensions of the desired exit pupil;

the thickness t of the light guide;

the width IP of the blind spots of the light guide. These zones are such that, for a given field, they transmit no light.

Figure 14:
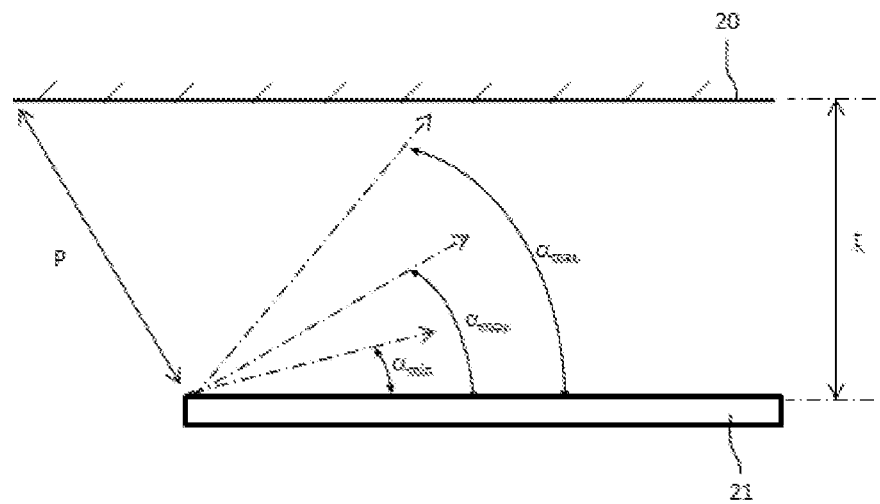
FIG. 14 shows the various incidences of a light guide according to the invention.
Figure 15:
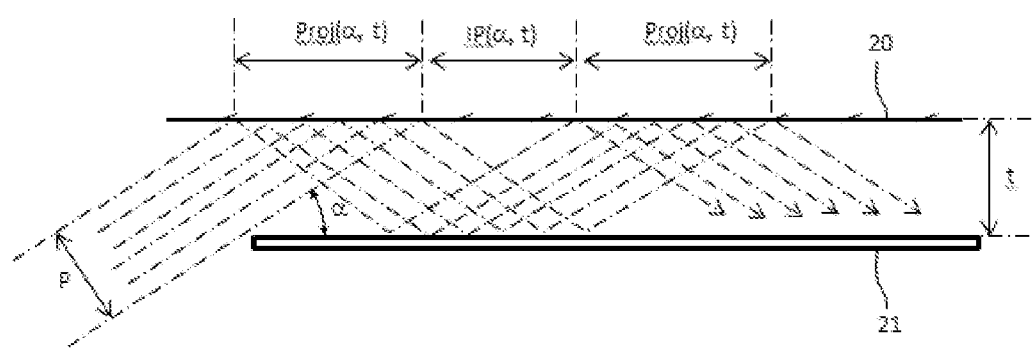
FIG. 15 shows the various parameters in a light guide according to the invention.
Figure 16:
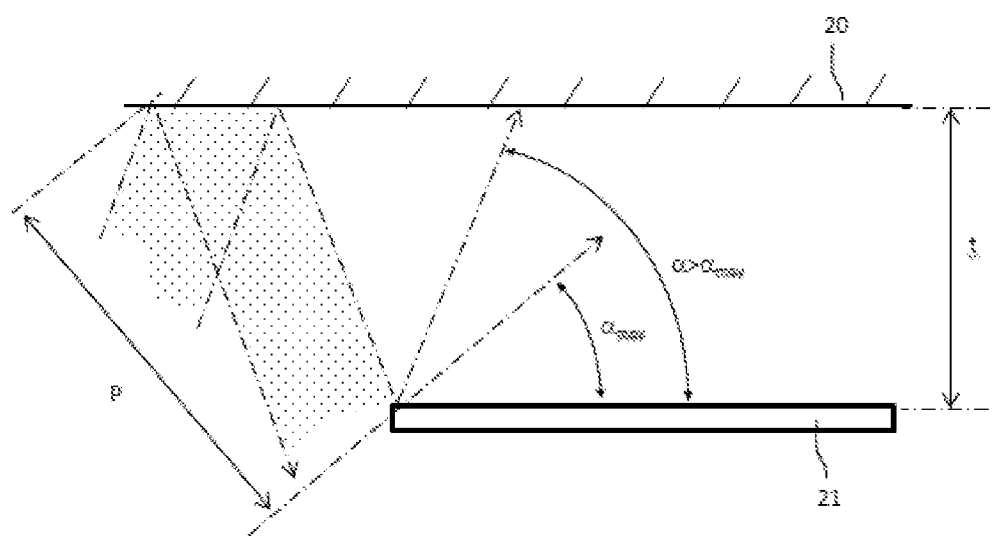
FIG. 16 shows the occupation of the pupil in a light guide according to the invention.

These various parameters are shown in FIGS. 14 to 16, which show three partial cross-sectional views of a light guide at its junction with the optical assembly. This guide comprises the mirror 20 and the semi-reflective plate 21.

The various parameters are subjected to physical and/or geometric constraints. The first constraint relates to the size of the entrance pupil P. This size of the pupil P is constrained by the maximum aperture of the collimating optic.

By way of example, for an imager of 0.7 inches diagonal and a numerical aperture lower than f/0.9, the maximum diameter of the pupil may be considered to be 21 millimetres.

In the case where the viewing system is an HUD, the maximum output luminance, measured at the eye of the user, must be high, about 7000 Cd/m², if the image output from the display is to be perceived with a good contrast on a very bright background.

However, the output luminance is inversely proportional to the ratio between the area of the exit pupil of the system and the area of the entrance pupil or more precisely the projection of the entrance pupil onto the surfaces of the guide. The higher this ratio, the lower the output luminance for a given input luminance. So as to decrease this ratio, and on account of the high required output luminance of the system, it is therefore preferable to choose the largest possible entrance pupil. In the present case, a diameter of 21 millimetres is a good compromise.

As may be seen in FIG. 15, the projection of the entrance pupil as a function of the field $\alpha$ and of the thickness t has been denoted $Proj(\alpha,t)$ and the distance between two successive projections of the pupil resulting from two successive reflections between the mirror and the semi-reflective plate has been denoted $IP(\alpha,t)$.

For a field α of high value, some of the rays do not propagate into the guide. The projection Proj(α,t) is partially occulted, as may be seen in FIG. 16. Thus, the portion of the rays of incidence a that has been represented by the dotted region in this figure does not enter into the light guide.

However, it is important for the projection of the pupil, for all the fields, to be larger than a minimum size $Proj_{min}$ in order to decrease the ratio between the exit pupil and entrance pupil and to obtain a sufficient output luminance. This means that the maximum field $\alpha_{max}$ that is injected will be constrained.

By way of example of determination of this minimum size $Proj_{min}$ and therefore of the maximum field $\alpha_{max}$, the exit pupil of the guide is considered to be a rectangle of 30 centimetres×20 centimetres, i.e. a covered area Pout of 600 cm². It is desired for the luminance Lout in this exit pupil to be 7000 Cd/m². The luminance Lin of the image, at the entrance of the light guide, is about 5×10⁶ Cd/m². Lastly, the transmission T of the entirety of the system, on account of losses in the guide and the transmission of the combiner, is equal to 70%. Thus, the minimum area that the entrance pupil Pin may have is equal to:

$$Pin = T \cdot Pout \cdot \frac{Lout}{Lin}$$

With the indicated values, this area is equal to 1.2 cm², i.e. a diameter of about 1.2 centimetres.

Geometrically, the following relationship is obtained:

$$\alpha_{max} = atan\frac{2t}{Proj(\alpha_{max})} = atan\frac{2t}{Proj_{min}}$$

The projections of the pupil, for all the fields α, must be spaced apart by a value IP(α,t) smaller than a maximum value $IP_{max}$. This maximum value $IP_{max}$ is set to 1.5 mm, corresponding to half the minimum size of the pupil of the eye when said pupil is subjected to bright illumination.

However, geometrically $$\tan\alpha = \frac{2t}{(P(\alpha)+IP(\alpha))}$$

IPmax constrains the minimum field $\alpha_{min}$ that it is possible to inject into the light guide.

Therefore $$\tan\alpha_{min} = \frac{2t}{Proj(\alpha_{min})+IP_{max}} \text{ or } Proj(\alpha_{min}) = P/\cos\alpha_{min}$$

Therefore $$\tan\alpha_{min} = \frac{2t}{P/\cos\alpha_{min}+IP_{max}}$$

Taking into account these various constraints, the maximum field injectable into the guide is determined. In other words, t is sought such that:

FOV(t)=$\alpha_{max}(t)-\alpha_{min}(t)$ is maximal, with $Proj_{min}$ respecting:

$$\alpha_{max}(t) = atan\frac{2t}{Proj_{min}}$$

while knowing that $$\tan\alpha_{min} = \frac{2t}{P/\cos\alpha_{min}+IP_{max}} \quad \text{(Equation 1)}$$

The $\alpha_{min}$ that maximizes the field FOV($\alpha_{min}$) is therefore sought.

If it is assumed that x=cos $\alpha_{min}$, then it may be demonstrated that, if $\alpha_{min}$ maximizes FOV($\alpha_{min}$), then x respects the equation:

$(Proj_{min}^2-IP_{max}^2)\cdot x^4+(Proj_{min}-2\cdot IP_{max})\cdot P\cdot x^3+(IP_{max}^2-Proj_{min}^2-Proj_{min}\cdot IP_{max})\cdot x^2+2\cdot(IP_{max}-Proj_{min}+P)^2=0$ If $Proj_{min}$=12 mm, $IP_{max}$=1.5 mm and P=21 mm are chosen, it is found that x0.7 and therefore that the FOV is maximum for $\alpha_{min}$=45°.

Using Equation (1) it may be deduced therefrom that the FOV is maximum for t=15.7 mm and $\alpha_{max}$=69° and therefore max(FOV(t))=24°.

If $Proj_{min}$=5 mm is chosen, the other values remaining unchanged, then max(FOV(t))=36°.

The distance t required to inject the maximum field, and the minimum and maximum field angles injectable into the light guide, have thus been determined with the preceding parameters.

An identical approach makes it possible to determine the distance between the two other mirrors in the other spatial dimension when the light guide is two-dimensional.

The length and width of the mirrors and of the semi-reflective plates are dimensioned by the size of the eye box desired as output from the light guide and by the eye relief, i.e. the optical distance between the exit of the light guide and the eye of the user.

Modelling of the system with, for example, an optical simulation software package, then allows the exact size of the exit pupil of the system, and therefore the size of light guide required to obtain this exit pupil, to be determined.

The various geometric parameters of the viewing device according to the invention being defined, it is then easy, with an optical simulation software package, to determine the transmittance of the semi-reflective plates allowing the best luminance uniformity in the eye box to be obtained.

The invention claimed is:

1. A viewing device comprising:
an optical assembly comprising a display and an optical system forming of this display an image at infinity, wherein the viewing device comprises a pupil-expansion light guide arranged so as to extend a pupil in two spatial directions, said pupil-expansion light guide comprising an optical assembly consisting of a first reflective planar mirror, of a second reflective planar mirror, of a third reflective planar mirror, of a first semi-reflective planar plate and of a second semi-reflective planar plate, the second semi-reflective plate being in the same plane and in the extension of the first reflective planar mirror, the second semi-reflective plate and the first reflective planar mirror being parallel to the second reflective planar mirror, the first plate being parallel to the reflective planar third mirror, the first plate and the third reflective planar mirror being perpendicular to the first reflective planar mirror, the first plate being located at the junction of the first reflective planar mirror and of the second semi-reflective plate, the optical axis of the optical assembly being inclined with respect to the surface of the first planar mirror by an angle different from zero and strictly smaller than 90 degrees, the light beams output from the optical assembly propagating inside the light guide via successive reflections from the planar mirrors and the semi-reflective plates, the transmission of the light beams output from the optical assembly to outside of the light guide occurring via successive transmissions by the second semi-reflective plate.

2. The viewing device according to claim 1, wherein the viewing device comprises an optical combiner with no optical power that is placed after the light guide, reflects the light output from the light guide and transmits the light output from a source exterior to the device.

3. The viewing device according to claim 1, wherein at least one of the semi-reflective plates has a variable optical transmission so that the light beams output from the optical assembly and transmitted to outside the light guide by successive transmissions and reflections inside the light guide have substantially the same overall luminance.

4. The viewing device according to claim 2, wherein the optical combiner has a variable optical transmission.

5. The viewing device according to claim 1, wherein the field of the optical system is smaller than or equal to 40 degrees on at least one of its axes.

6. The viewing device according to claim 1, wherein the angle of inclination of the optical axis is comprised between 50 degrees and 60 degrees.

7. The viewing device according to claim 1, wherein the distance separating the first planar mirror from the second planar mirror is comprised between 10 millimetres and 20 millimetres and the distance separating the third planar mirror from the first semi-reflective plate is comprised between 10 millimetres and 20 millimetres, the diameter of the entrance pupil of the viewing device being comprised between 15 millimetres and 25 millimetres.

8. The viewing device according to claim 1, wherein for any inclination of the light beams output from the optical assembly, the separation between a beam propagating through the light guide and the following beam having undergone two additional reflections from a planar mirror and the semi-reflective plate that is parallel thereto is smaller than 1.5 millimetres.

* * * * *